(12) United States Patent
Tsurufuji et al.

(10) Patent No.: US 6,411,928 B2
(45) Date of Patent: *Jun. 25, 2002

(54) APPARATUS AND METHOD FOR RECOGNIZING VOICE WITH REDUCED SENSITIVITY TO AMBIENT NOISE

(75) Inventors: Shin-ichi Tsurufuji; Masayuki Iida; Ryuji Suzuki, all of Kyoto-fu (JP)

(73) Assignee: Sanyo Electric, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/897,734

(22) Filed: Jul. 21, 1997

Related U.S. Application Data (63) Continuation of application No. 08/353,878, filed on Dec. 12, 1994, now abandoned, which is a continuation of application No. 08/080,396, filed on Jun. 21, 1993, now abandoned, which is a continuation of application No. 07/653,426, filed on Feb. 8, 1991, now abandoned.

(30) Foreign Application Priority Data

| Feb. 9, 1990 | (JP) | 2-030185 |
| Oct. 16, 1990 | (JP) | 2-278393 |
| Oct. 18, 1990 | (JP) | 2-281020 |

(51) Int. Cl.[7] .......................... G10L 15/00; G10L 21/00
(52) U.S. Cl. ........................ 704/233; 704/226
(58) Field of Search .................... 704/200, 226, 704/227, 228, 233, 246, 248, 251, 253

(56) References Cited

U.S. PATENT DOCUMENTS

| 4,239,936 A |   | 12/1980 | Sakoe .......................... 381/46 |
| 4,625,083 A | * | 11/1986 | Poikela ........................ 381/46 |
| 4,696,039 A | * | 9/1987 | Doddington .................. 381/46 |
| 4,829,578 A | * | 5/1989 | Roberts ....................... 381/46 |
| 4,905,286 A | * | 2/1990 | Sedgwick et al. .......... 704/233 |
| 4,918,732 A | * | 4/1990 | Gerson et al. .............. 704/233 |
| 4,918,734 A | * | 4/1990 | Muromatsu et al. .......... 381/46 |
| 5,212,764 A | * | 5/1993 | Ariyoshi ..................... 704/233 |
| 5,459,814 A | * | 10/1995 | Gupta et al. ................ 704/233 |

FOREIGN PATENT DOCUMENTS

| JP | 52157966 | 12/1977 |
| JP | 52157967 | 12/1977 |
| JP | 52157 969 | 12/1977 |

\* cited by examiner

Primary Examiner—Patrick N. Edouard
(74) Attorney, Agent, or Firm—Darby & Darby (57) ABSTRACT

A voice recognition method and apparatus in which an electrical signal corresponding to ambient noise is used to set a threshold value in accordance with the level of the ambient noise and a voice signal applied to a microphone is cut-out for processing if it exceeds the threshold value. The processing includes comparison of the voice signal cut-out with stored patterns of voice signals.

34 Claims, 10 Drawing Sheets

APPARATUS AND METHOD FOR RECOGNIZING VOICE WITH REDUCED SENSITIVITY TO AMBIENT NOISE

This is a continuation, of application Ser. No. 08/353,878, filed Dec. 12, 1994, now abandoned which is a continuation of application Ser. No. 08/080,396 filed Jun. 21, 1993, now abandoned which is a continuation of application Ser. No. 07/653,426 filed Feb. 8, 1991 now abamdoned.

BACKGROUND OF THE INVENTION

1. Field of the Invention

The present invention relates to an apparatus and method for recognizing voice. More specifically, the present invention relates to an apparatus and method for recognizing voice without influence of ambient noise.

2. Description of the Prior Art

In a voice recognition apparatus, since voice to be recognized as well as ambient noise are inputted to a microphone, it is important to correctly recognize the voice without influence of the ambient noise.

In U.S. Pat. No 4,239,936 issued on Dec. 16, 1980, for example, a voice recognition system including two microphones is disclosed. The voice to be recognized is inputted to one of the microphones and ambient noise is inputted to the other of the microphones. A voice signal is inputted to a recognition unit to be spectrum-analyzed and an ambient noise signal is inputted to a noise measuring unit such that the strength thereof is measured. When the strength of the ambient noise exceeds a predetermined value, a threshold value is subtracted from a recognition result signal from the recognition unit in a noise rejection unit.

In the above described prior art, it is still impossible to implement noise rejection sufficient for correctly recognizing the voice because it is impossible to reject only the noise signal even if the above described threshold value is used since the two microphones respectively receive the voice to be recognized and the ambient noise. In addition, since the rejection standard is a constant level while the strength of the ambient noise varies, when the strength of the ambient noise is changed, the ambient noise cannot be sufficiently rejected.

OBJECTS OF THE INVENTION

Therefore, a principal object of the present invention is to provide a novel apparatus and method for recognizing voice.

Another object of the present invention is to provide an apparatus and method for recognizing voice in which it is possible to further reduce influence of ambient noise.

Another object of the present invention is to provide an apparatus and method for recognizing voice in which it is possible to correctly and surely recognize a voice even if a level of ambient noise varies.

Another object of the present invention is to provide an apparatus and method for recognizing voice in which it is possible to register a reference pattern without influence of ambient noise.

BRIEF DESCRIPTION OF THE INVENTION

A voice recognizing apparatus in accordance with the present invention has a microphone for inputting voice to a circuit for sampling a voice signal from the microphone exceeding a threshold value. The threshold value is changed in accordance with a level of ambient noise.

A voice recognizing method in accordance with the present invention detects a level of ambient noise; variably sets a threshold level in response to a level of detected ambient noise; and detects a boundary of a voice signal inputted from a microphone in accordance with the threshold value.

In accordance with the present invention, since a threshold value for sampling the voice signal is changed in accordance with a level of the ambient noise, it is possible to correctly recognize the voice inputted from the microphone without influence of the ambient noise even if the level of the ambient noise varies. In addition, if the present invention is utilized for registration of a reference pattern, even if such a reference pattern is registered under a noisy circumstance, it is possible to prevent a reference pattern which is modified by the ambient noise from being registered. Therefore, it is possible to recognize the voice with accuracy.

In one embodiment, after the voice signal from the microphone is sampled in accordance with the threshold value which is determined in accordance with an amplitude of the ambient noise level, a true head and a true tail of the voice to be recognized are detected. Therefore, in accordance with this embodiment, recognition accuracy can be further increased.

In another embodiment, the ambient noise is generated from a loudspeaker by an audio signal from an audio equipment, and therefore, as a signal representative of the ambient noise, the audio signal which is directly inputted from the audio equipment is utilized. In accordance with this embodiment, a further microphone for converting the ambient noise into an electrical signal is not required and also the ambient noise level can be surely detected. However, the ambient noise may be inputted to the further microphone as sound.

In accordance with another embodiment, a feature parameter of the noise is produced and the feature parameter is eliminated from the feature parameter of the voice signal inputted from the microphone, and therefore, a feature parameter pattern for recognition or registration is not affected by the noise.

The objects and other objects, features, aspects and advantages of the present invention will become more apparent from the following detailed description of the embodiments of the present invention when taken in conjunction with accompanying drawings.

DETAILED DESCRIPTION OF THE PREFERRED EMBODIMENTS

Figure 1:
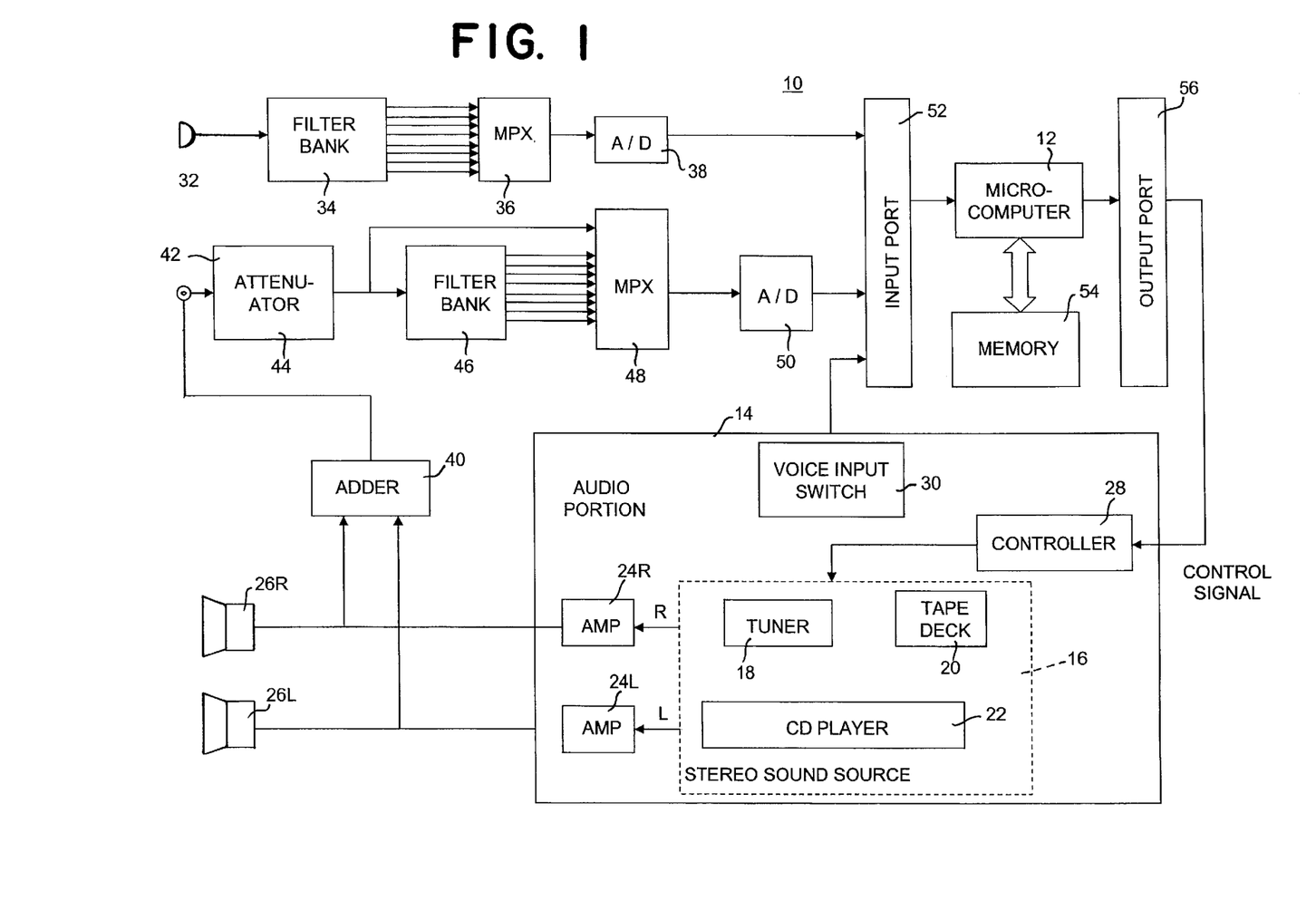
FIG. 1 is a block diagram showing a stereo receiver for an automobile is described as one embodiment in accordance with the present invention.

In referring FIG. 1, a stereo for automobile 10 which is one embodiment in accordance with the present invention includes a microcomputer 12 by which an audio portion 14 is controlled. The audio portion 14 comprises a stereo sound source 16 including conventional FM/AM a tuner 18, a tape deck 20, CD player 22 and etc., each of which respond to stereo (L&R) signals. These can be taken separately or from a common amplifier of terminal strip (not shown) as a right signal R and a left signal L from the stereo sound source 16 and are respectively applied to loudspeakers 26R and 26L, which are arranged at suitable positions in an interior of an automobile (not shown) through amplifiers 20R and 24L. In a case where the stereo sound source 16 is a 4-channel stereo, rear signals are further outputted.

A controller 28 is further included in the audio portion 14, and the controller 28 comprises operation switches (not shown) for manually operating the stereo sound source 16. However, in a case where the audio portion 14 and thus the stereo sound source 16 is controlled by control signals from the microcomputer 12, a voice input switch 30 provided on the audio portion 14 is operated. In this case, in addition to operation signals from the above described operation switches, control signals from the microcomputer 12 are inputted to the stereo sound signals generating apparatus 16.

On the other hand, on a dashboard (not shown) of the automobile, a microphone 32 for picking-up the voice of a driver for controlling the audio portion 14 is arranged. A voice signal from the microphone 32 is applied to a filter bank 34. As well known, the filter bank 34 includes bandpass filters of 8 channels, and therefore, feature parameters of the voice signal inputted from the microphone 32 are extracted by the bandpass filters. More specifically, the filter bank 34 comprises a preamplifier, automatic gain control, bandpass filter, rectifying circuit and a lowpass filter for each channel. Respective feature parameters (analog signals) from the filter bank 34 are inputted to a multiplexer 36. The multiplexer 36 time-sequentially outputs the feature parameters of 8 channels inputted from the filter bank 34. Then, the voice signal outputted from the multiplexer 36 are converted into feature parameter data by an A/D converter 38.

Furthermore, the right signal R and the left signal L (and rear signals, if any) from the stereo sound source 16 included in the audio portion 14 are added to each other by an adder 40, and a signal from the adder 40 is applied to a terminal 42 as an electrical signal representative of ambient noise. Thus, a sound signal is directly applied to the terminal 42 from the audio portion 14. Although as described above, the stereo sound signals from the audio portion 14 are generated as sound from the loudspeakers 26R and 26L and thus the sound are inputted to the microphone 32 as the ambient noise, in this embodiment shown, by directly inputting the sound signal to the terminal 42 from the audio portion 14, the sound generated from the audio portion 14 are regarded and handled as the ambient noise.

Then, the sound signal (noise signal) inputted to the above described terminal 42 is applied to a filter bank 46 having structure similar to that of the above described filter bank 34 through an attenuator 44. Feature parameters (analog signals) of respective frequency bands from the filter bank 46 are inputted to a multiplexer 48. The multiplexer 48 further receives a noise signal from the attenuator 44 as it is, and time-sequentially outputs the feature parameters of 8 channels inputted from the filter bank 46 or a complete spectrum of the noise signal from the attenuator 44. The feature parameters of the noise and the complete spectrum noise signal outputted from the multiplexer 48 are converted into digital data by an A/D converter 50. Thus, as similar to the voice signal from the microphone 32, the noise signal from the terminal 42 is sampled and inputted as the feature parameter data.

A signal from the above described voice input switch 30 and outputs of the A/D converters 38 and 50 are inputted to the above described microcomputer 12 through an input port 52. The microcomputer 12 recognizes the voice inputted from the microphone 32 by comparing the parameters inputted from the input port 52 with respective reference patterns in a reference pattern table formed in the memory 54 as described later. Then, in accordance with a recognition result, the microcomputer 12 outputs the afore mentioned control signals to the audio portion 14 through an output port 56.

Therefore, if the voice for controlling the audio portion 14 is inputted to the microphone 32 when the voice inputs switch 30 is operated, in accordance with the voice, the control signal is outputted from the microcomputer 12. In response to the control signal, the controller 28 controls the stereo sound source 16.

Figure 2:
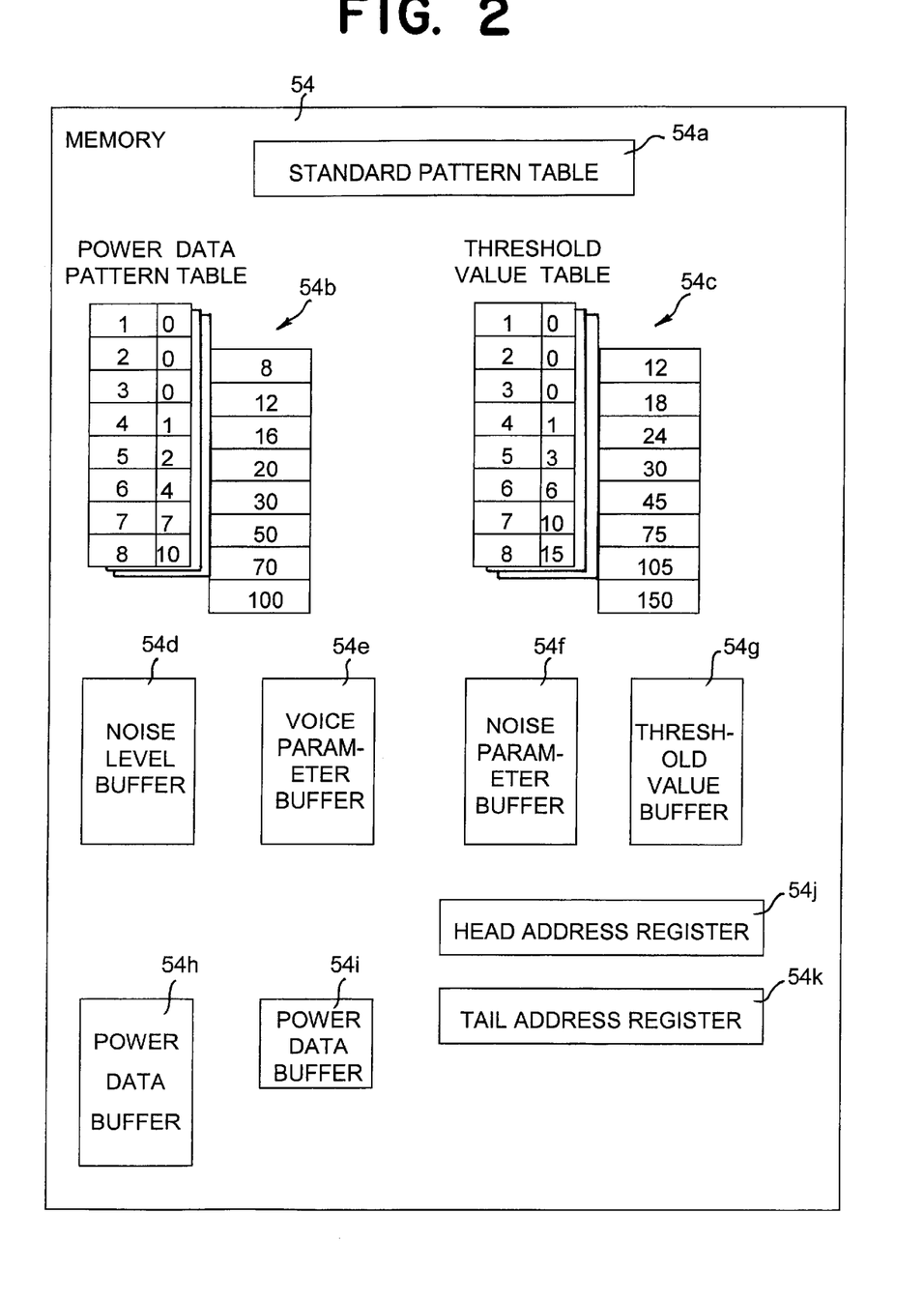
FIG. 2 is an illustrative view showing a memory map of a memory in the FIG. 1 embodiment.

The memory 54 includes, as shown in FIG. 2, a reference pattern table 54a in which the reference patterns of feature parameters of respective pronunciations or words for recognizing the voice based upon the feature parameter sampled by the filter bank 34 are set in advance. In addition, the reference pattern table 54a is constructed by a backed-up RAM, for example.

In the memory 54, a power data pattern table 54b and a threshold value table 54c are further assigned. In the power data pattern table 54b, power data patterns of 9 sets in total are set in advance in accordance with 8 noise levels 1–8, and in corresponding to the power data patterns set in the power data pattern table 54b, threshold value data for respective noise levels are set in the threshold value table 54c. The threshold data set in the threshold value table 54 are data of one and a half times, for example, the data set in the power data pattern table 54b. The reason is as follows: Since the sound power data is calculated as a weighted mean value in a learning mode, if such power data is used as the threshold value data as it is, large noise inputted from the microphone 32 is sampled as voice. This is to be prevented since it is a malfunction. In addition, the pattern table 54b and the threshold value table 54c may be constructed by a backed-up RAM or a ROM.

The memory 54 further includes a noise level buffer 54d, voice parameter buffer 54e, noise parameter buffer 54f and a threshold value buffer 54g. Each of the buffers 54d–54g has a plurality of addresses so that a series of data for a plurality of frames, i.e., voice samples, can be stored. In addition, one frame is set as 5 milliseconds, for example. The noise level buffer 54d stores frame by frame data representative of levels of the ambient noise which are applied from the attenuator 44 and the multiplexer 48 and converted into digital data by the A/D converter 50. The voice parameter buffer 54e stores frame by frame the feature parameter data of the voice inputted from the microphone 32 which are outputted from the A/D converter 38. The noise parameter buffer 54f stores frame by frame the feature parameter data of the noise signal inputted to the terminal 42 which are outputted from the A/D converter 50. The threshold value data buffer 54g stores frame by frame the threshold value data for sampling which are variably set as described later.

The memory 54 further includes a power data buffer 54h having addresses corresponding to respective noise levels and a power data buffer 54i having only one address. The power data buffer 54h is used in determining that the pattern of the voice power data is most similar to any one of the patterns of the power data pattern table 54b to decide a threshold value in the learning mode described later. The power data buffer 54i is utilized in determining a threshold value in the recognition mode or registration mode described later when the noise level is small.

In addition, the memory 54 includes a head address register 54j and a tail address register 54k. In the head address register 54j, data representative of an address of the voice parameter buffer 54e which stores a head of a series of feature parameter data exceeding the threshold value is stored. In the tail address register 54k, data representative of an address of the voice parameter buffer 54e which stores a tail of the series of feature parameter data exceeding the threshold value is stored.

Next, with reference to FIGS. 3A–3G, an operation of the embodiment shown in FIGS. 1 and 2 will be described.

Figure 3A:
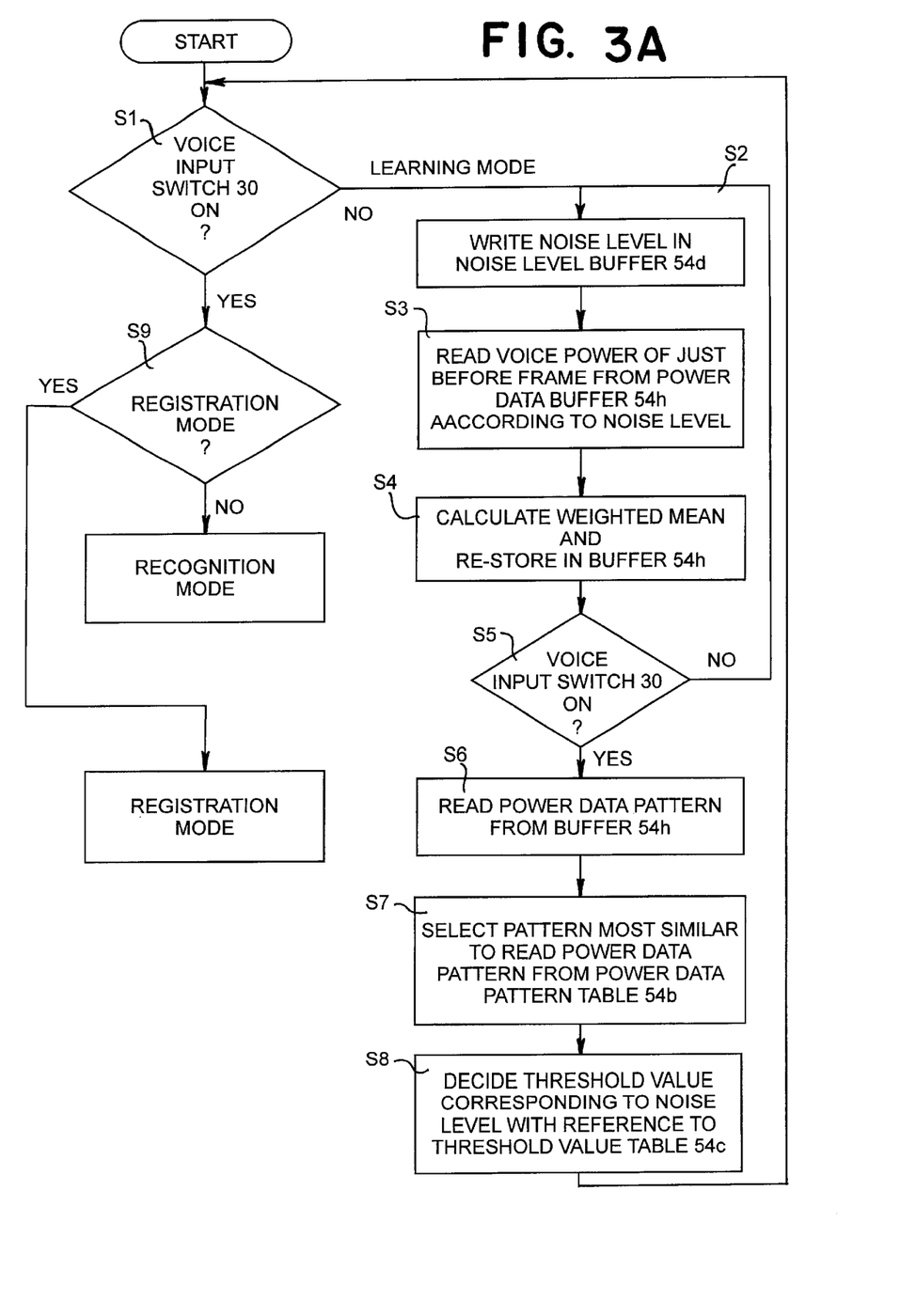
FIGS. 3A–3G are flowcharts showing an operation of the FIG. 1 embodiment.

In a first step S1 of FIG. 3A, the microcomputer 12 determines on the basis of a signal from the input port 52 whether or not the voice input switch 30 of the audio portion is turned-on. When the voice input switch 30 is not turned-on, the learning mode which is a mode other than the recognition mode wherein the audio portion 14 is controlled by a voice input to the microphone 32 or the registration mode for registering a voice input from the microphone 32 is set. The learning mode is a mode for preliminarily setting a threshold value for sampling the voice signal prior to the recognition mode or registration mode.

Therefore, if "NO" is determined in the step S1, the process proceeds to a step S2. In the step S2, data representative of a level of a full spectrum noise signal which is inputted to the A/D converter 50 not through the filter bank 46 and converted into digital data therein is written in the noise level data buffer 54d. In a next step S3, power data is read from an address of the power data buffer 54h corresponding to the noise level data. In addition, the power data can be evaluated by summing the feature parameters stored in the voice parameter buffer 54e. Then, in a step S4, a weighted mean value of read power data and power data being inputted currently is calculated. Assuming that the read power data from the power data buffer 54h, which is also a result of the calculation of a weighted mean value, is $P_n$, and the number of times that the noise levels which result in $P_n$ are inputted, and a current power is N, the following equation is used for calculating a new weighted mean value $P_{n+1}$;

$$P_{n+1} = \frac{P_n + P}{N + 1}$$

The new weighted mean value $P_{n+1}$ thus evaluated is restored in an address of the power data buffer 54h corresponding to the noise level at that time. Thus, in the learning mode, the power data buffer is renewed at every timing when the noise level data is inputted.

In a next step S5, the microcomputer 12 determines again whether or not the voice input switch 30 is turned-on. In a case where the voice input switch 30 is not turned-on, the above described steps S2 to S4 are repeatedly executed.

When the voice input switch 30 is turned-on, in a step S6, the pattern of the power data which is calculated in the previous step S4 and stored in the power data buffer 54h. Succeedingly, in a step S7, the power data pattern which is most similar to the power data pattern as read is selected from the power data pattern table 54b. A selection method is as follows: a current power data total sum is subtracted from each of the power data and 9 total sums of the mean value, is $P_n$, and the number of times that the noise levels which value, is $P_n$, and the number of times that the noise levels which result in $P_n$, are inputted is N, and a current power is P, the following equation is used for the power data patterns by which the resultant numerical value becomes smallest are selected.

Then, in a step S8, with reference to the threshold value table 54c, a threshold value corresponding to a noise level inputted in the step S2 is determined. More specifically, a threshold value pattern corresponding to the power data pattern selected in the step S7 is selected from the threshold value table 54c, and a threshold value corresponding to the noise level at that time is selected from the threshold values of respective noise levels included in a selected threshold value pattern and a selected threshold value is preliminarily set as a threshold value for the recognition mode or registration mode. That is, in the learning mode, in accordance with the pattern of the power of the voice inputted from the microphone 32, the threshold value is-variably set in accordance with an amplitude of the noise level.

When it is detected that the voice input switch 30 is turned-on in the previous step S1, the microcomputer 12 determines whether or not the registration mode is set in a step S9. If the registration mode is not set, the recognition mode will be executed.

Figure 3B:
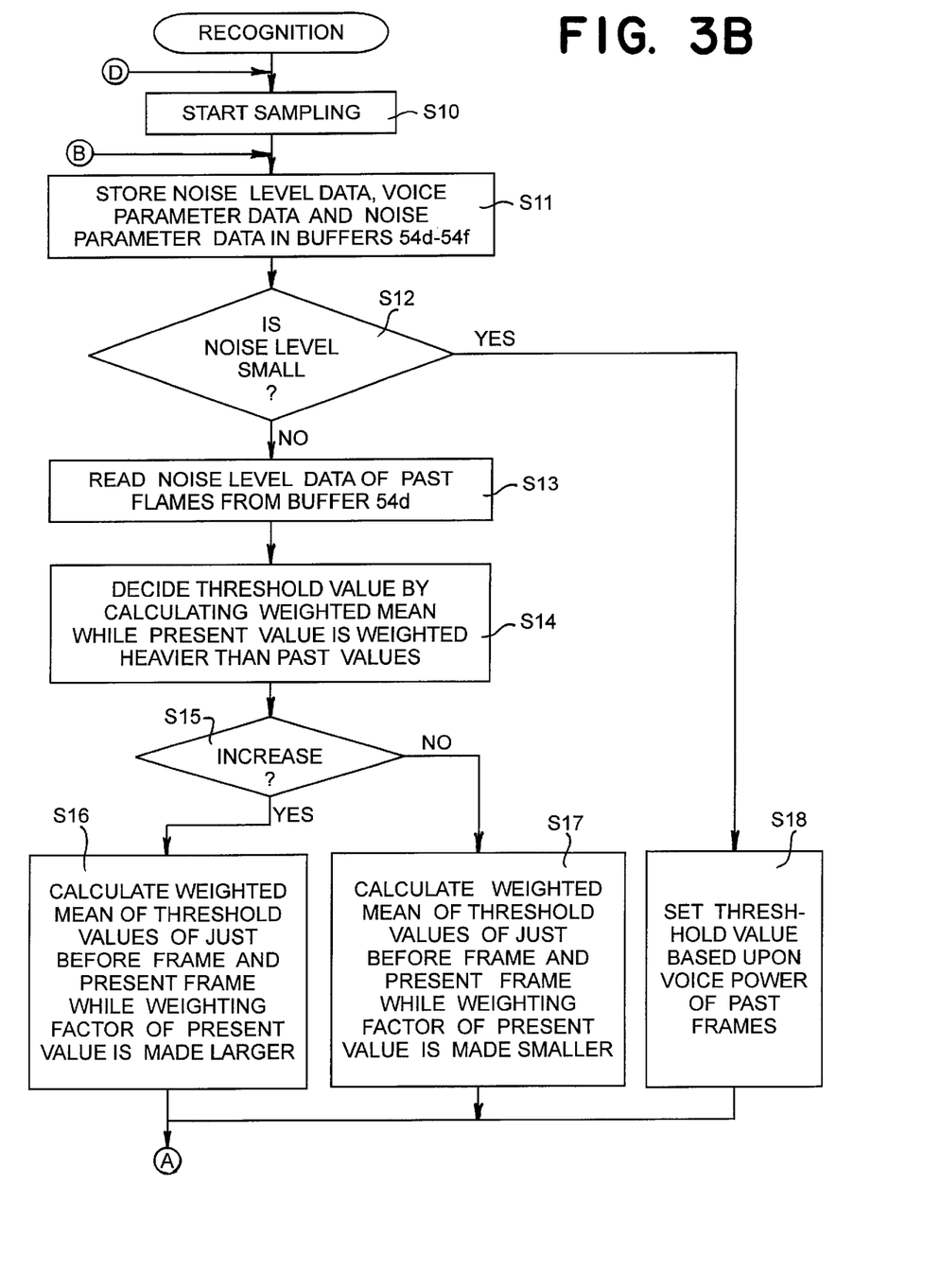

In a first step S10 of the recognition mode as shown in FIG. 3B, the microcomputer 12 starts sampling of the voice input from the microphone 32 and the noise level from the terminal 42. Then, in a step S11, sampled noise level data, sampled voice parameter data and sampled noise parameter data are respectively stored in the noise level data buffer 54d, voice parameter buffer 54e and the noise parameter buffer 54f. In a step S12, the microcomputer 12 determines whether or not the noise level inputted at that time is small.

If the noise level is not small, in a step S13, the microcomputer 12 reads the noise level data of the past frames (for example, 10 frames) from the noise level buffer 54d. Then, in a step S14, by calculating a weighted mean value of the noise levels, a threshold value is determined. That is, on the basis of consideration similar to that of the previous equation, a weighted mean value of the noise levels is calculated, and in accordance with a noise level thus obtained, a threshold value corresponding to the noise level is read from the threshold value table 54c. However, in order to set a threshold value which is more matched to a situation of the current noise, the weight of the current noise level is made heavier than that of the past noise levels.

Next, in a step S15, the microcomputer 12 determined whether or not the noise level currently increases by comparing the data of the current noise level with the data of immediately preceding frame which is stored in the noise level buffer 54b.

If the noise level increases, in a step S16, the microcomputer 12 calculates a weighted mean value of threshold values of the past frame being stored in the threshold value buffer 54f and the threshold value of the current frame evaluated in the previous step S14. At this time, a weighing coefficient of the threshold value of the current frame (for example, "1.0") is set to be larger than a weighing coefficient of the past threshold value (for example, "0.5") because it is necessary to set a larger threshold value in correspondence to the increase of the noise level.

If the noise level does not increase, in a step S17, the microcomputer 12 calculates a weighted mean value by the threshold values of the past frames and the threshold value of the current frame. At this time, in reverse to the step S16, a weighing coefficient of the threshold value of the current frame (for example, "0.5") is set to be smaller than a weighing coefficient of the past threshold value (for example, "1.0") because it is necessary to set a smaller threshold value in correspondence to the decrease of the noise level.

In addition, "YES" is determined in the previous step S12, that is, it is determined that the noise level is small, in a step S18, the microcomputer 12 sets a threshold value on the basis of the power data of the past frames. More specifically, a simple mean value of the voice power of the past frames is calculated by the microcomputer 12 and stored in the power data 54$i$ (FIG. 2), but a higher power level, approximately one and a half times in the example described, than the power stored in the power data buffer 54$i$ is set as a threshold value for sampling.

Thus, in the recognition mode, a threshold value for sampling the voice to be recognized is determined in accordance with an amplitude of the noise level inputted to the terminal 42 from the audio portion 14. However, in any case, the threshold value thus set is stored in the threshold value buffer 54$g$.

Next, in a step S19, the microcomputer 12 determines whether or not the feature parameter of the voice being stored in the voice parameter buffer 54$e$ exceeds the threshold value set as described above. If the feature parameter of a given frame exceeds the threshold value, since the frame is a head frame of the voice or word to be recognized, in a next step S20, the microcomputer 12 loads an address of the voice parameter buffer 54$e$ in which the feature parameter of that frame is stored to the head address register 54$j$ as the head address. In the FIG. 4 example, an address of the frame Fh' becomes the head address.

Figure 4:
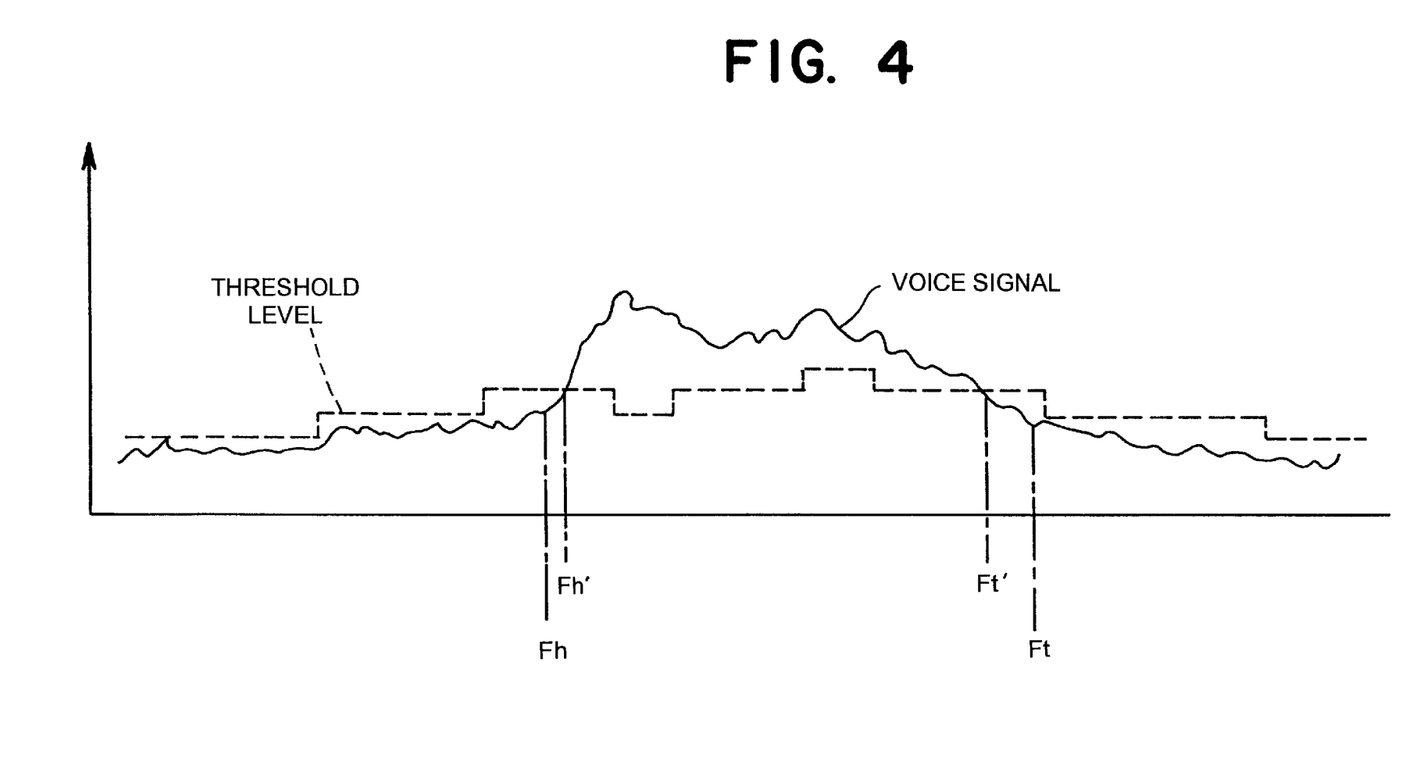
FIG. 4 is a waveform chart showing a state where a boundary of a voice signal is sampled in the FIG. 1 embodiment.

Next, in a step S21, the microcomputer 12 determines whether or not the feature parameter being stored in the voice parameter buffer 54$e$ becomes below the threshold value. If the feature parameter of a given frame becomes below the threshold value, since the frame is a tail frame of the voice or word to be recognized, in a next step S22, the microcomputer 12 loads an address of the voice parameter buffer 54$e$ in which the voice feature parameter data of that frame is stored to the tail address register 54$k$ as the tail address. In FIG. 4 example, an address of the frame Ft' becomes the tail address.

Thus, in accordance with the threshold value which is set in any one of the steps S16–S18, the feature parameters of the succeeding frames from Fh' to Ft' are provisionally sampled as the feature parameters of the voice to be recognized.

Figure 3C:
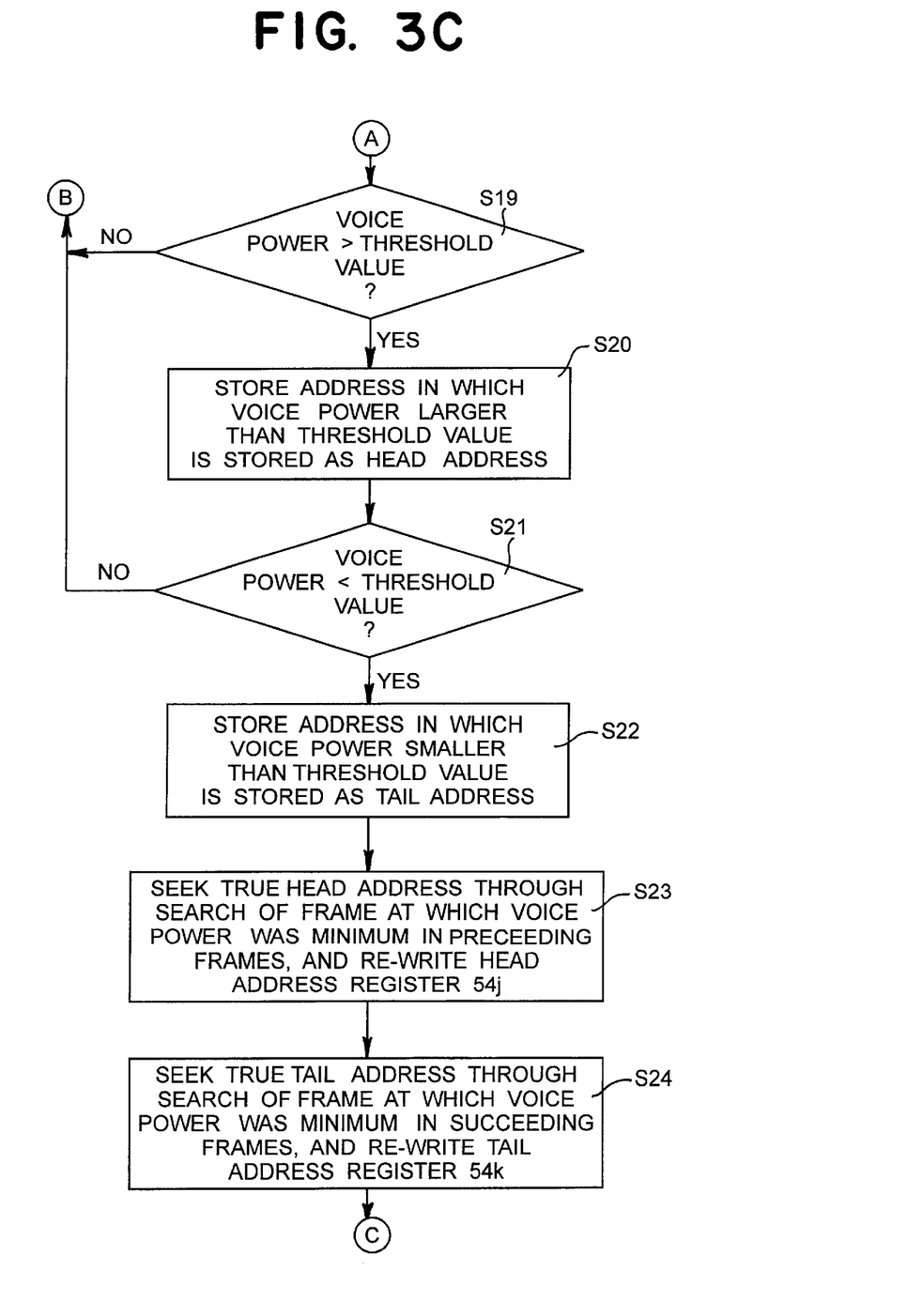
Figure 3D:
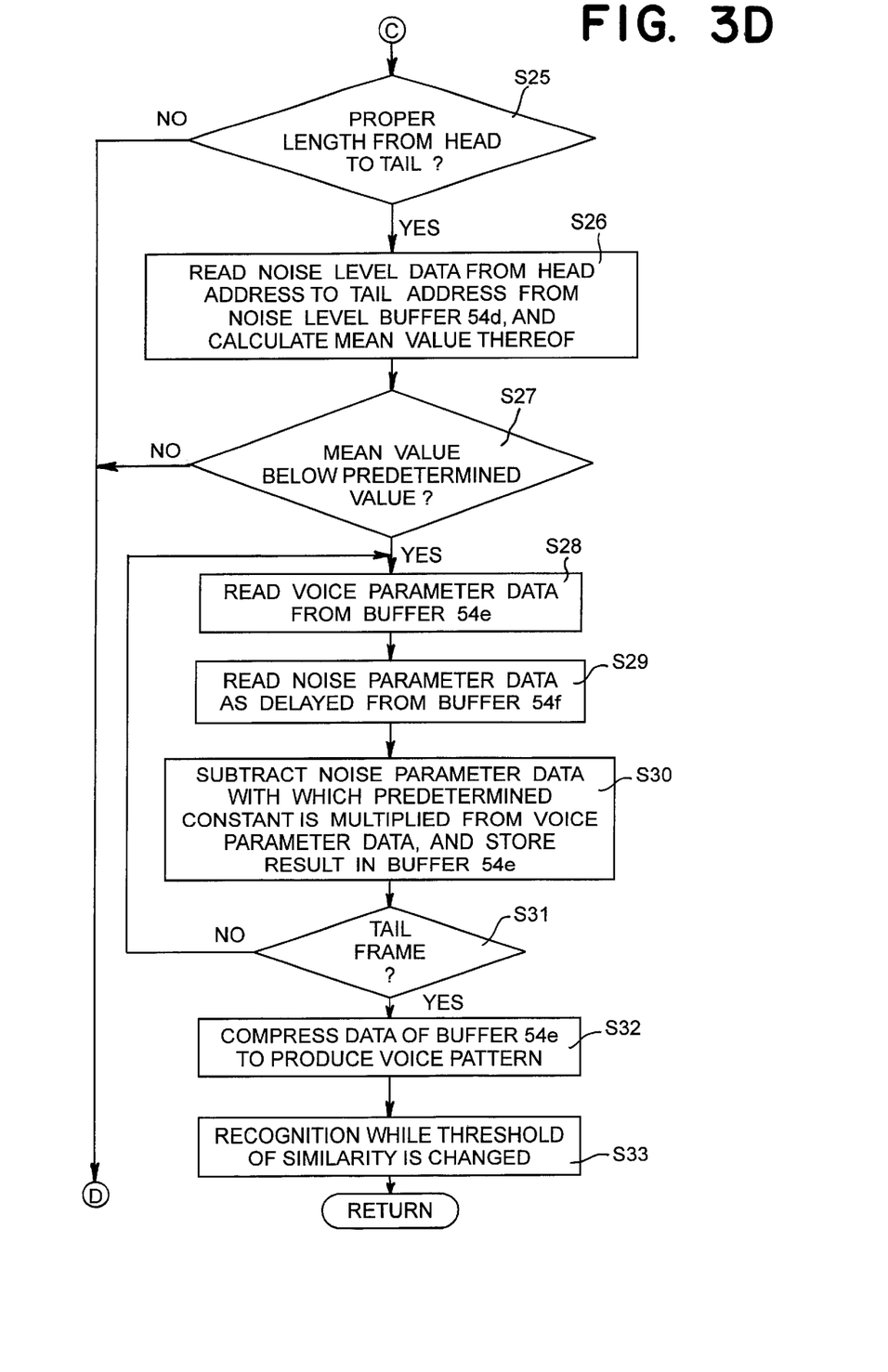
Figure 3E:
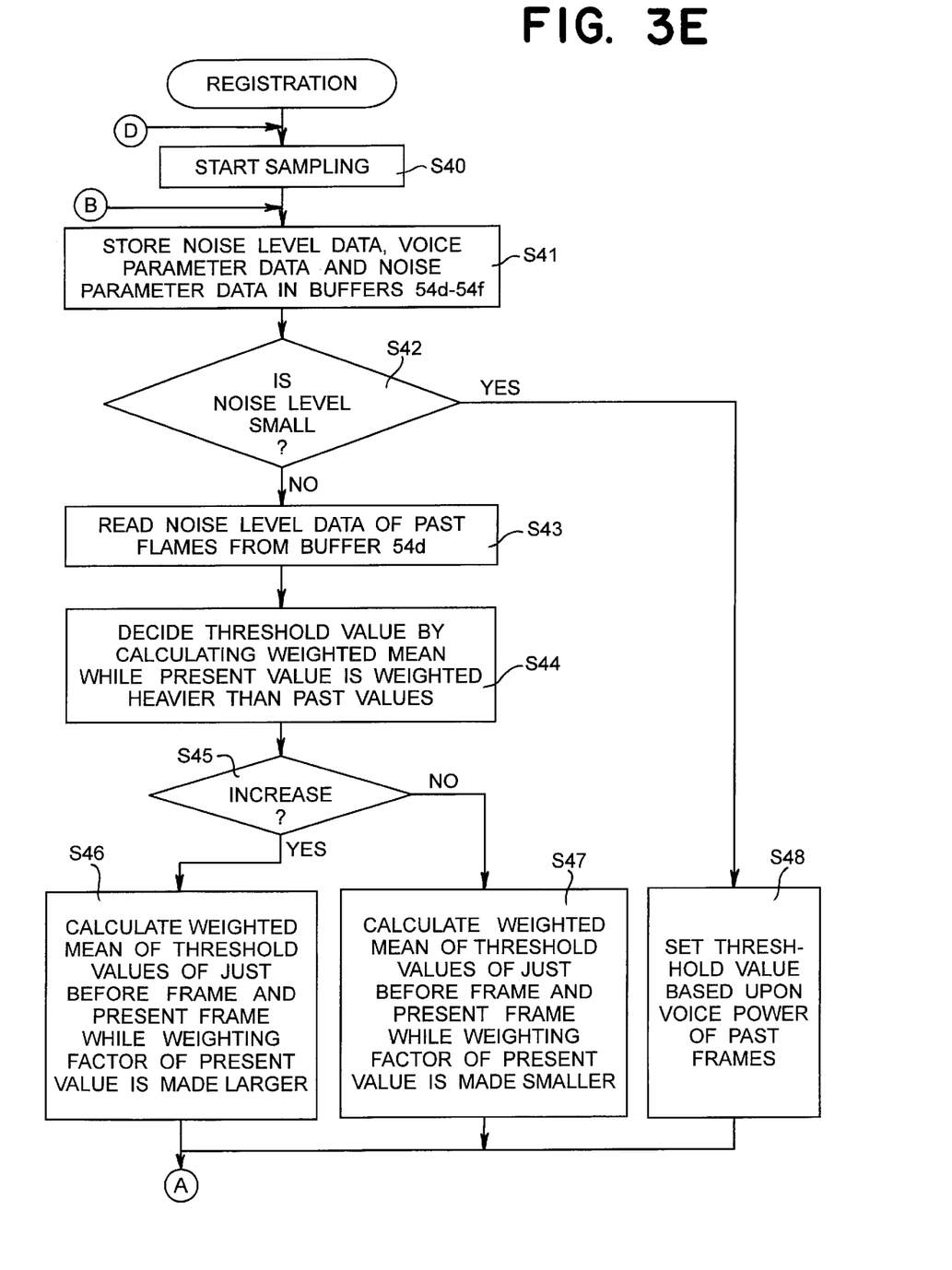

In next steps S23 and S24, the microcomputer 12 seeks a correct head address and a correct tail address, respectively because the threshold value previously set is determined in accordance with an amplitude of the noise level; however, if the noise level is large, the threshold value is also large, it is apprehended that a head and a tail of the voice cannot be sampled correctly. Then, in the step S23, by searching a frame in which the voice power was minimum out of the frames before the frame indicated by the head address determined in the step S20, a true head of the voice to be recognized is sought. In FIG. 4 example, an address of the frame Fh becomes the true head address. Similarly, in the step S24, by searching a frame in which the voice power was minimum out of the frames after the frame indicated by the tail address determined in the step S20, a true tail of the voice to be recognized is sought. In FIG. 4 example, an address of the frame Ft becomes the true tail address.

Then, in a step S25, the microcomputer 12 determines whether or not a time period from the frame indicated by the true head address to the frame indicated by the true tail address is within a proper length, for example, 0.3–1.5 seconds. A value of this time period is set experimentally, and thus, the same may be changed suitably. If the time period is not proper, the process returns to the previous step S10 (FIG. 3B) without execution of the following recognition operation.

If the time period is proper, in a next step S26, the noise level data between the frames respectively corresponding to the true head address and the true tail address are read from the noise level buffer 54$d$, and a simple mean value of the noise level data is calculated. Then, in a step S27, it is determined whether or not the average noise level is below a predetermined value. The reason is that when the average noise level is large, the threshold value is also large, and thus, there is possibility that the voice has not been correctly sampled, and in such a case, in order to prevent malfunction, it is required that the sampling of the voice data is made invalid so as not to recognized voice. Therefore, in a case where "NO" is determined in the step S27, the process returns to the previous step S10 (FIG. 3B) with no operation.

In a case where "YES" is determined in the step S27, the microcomputer 12 reads the voice parameter data from the voice parameter buffer 54$e$ in a succeeding step S28 and reads the noise parameter data from the noise parameter buffer 54$e$ in a step S29. Then, in a step S30, the noise parameter data is subtracted from the voice parameter data, and result data is re-stored in the voice parameter buffer 54$a$. Thus, only the feature parameters of the voice inputted to the microphone 32 can be stored in the voice parameter buffer 54$e$. Then, operations from the step S27 to the step S30 are repeatedly executed for each frame until the tail frame is detected in a step S31.

In addition, as described above, in this embodiment shown, the sound signal from the audio portion 14 is directly inputted to the terminal 42 as the noise signal. On the other hand, a time when the sound from the audio portion 14 becomes the ambient noise with respect to the microphone 32 is a time when the sound actually generated from the loudspeakers 26R and 26L in response to the sound signal. Therefore, a time delay approximately 30 milliseconds, for example occurs from at the time when the sound signal is inputted to the terminal 42 to the time when the sound signal is inputted to the microphone 32 as the ambient noise. Therefore, if the noise parameters of the same frames as that of the voice parameters are subtracted from the voice parameters, they both become not coincident in time with each other due to the above described time difference. Therefore, in this embodiment, in a step S29, the noise parameter data which are delayed are read. That is, the noise parameter data which are delayed from the frames of the voice parameter buffer 54$e$ by approximately 6 frames.

In addition, in order to make the voice parameters and the noise parameters be coincident in time with each other by taking the above described delay time into consideration, a delay circuit may be inserted between the terminal 42 and the filter bank 46.

Furthermore, an amplitude of the noise signal directly inputted to the terminal 42 is larger than an amplitude of the noise which is generated from the loudspeakers 26R and 26L and then inputted to the microphone 32. Therefore, in this embodiment shown, by taking a difference of the levels into consideration, in a step S30, the noise parameters multiplied by $\alpha$ ($\alpha$ is a constant less than 1) are subtracted from the voice parameters.

Next, the voice data is compressed in a step S32, and thereafter, a recognition operation is executed in a step S33. That is, it is determined that the produced voice parameter pattern is most similar to any one of a number of reference patterns being set in advance in the reference pattern table 54$a$. Then, if there is a detection that a similarity S exceeds a predetermined value, the voice having the feature parameters is finally recognized. However, a threshold value of the similarity S may be changed in accordance with the noise level. More specifically, when the noise level is large, the threshold value of the similarity S (which becomes a threshold value of the recognition) is set to be small and, when the noise level is small, the threshold value of the similarity S is set to be large. The reason is that when the noise level is large, larger noise may be mixed with the voice from the microphone 32; Therefore, if the threshold value is low the result is that almost none of the voice, or words can be recognized. Therefore, when the noise level is large, the voice or word having a smaller similarity is recognized.

The recognition operation itself can use any conventional technique and it is possible to apply a recognition method such as used in the U.S. Pat. No. 4,239,936 previously cited. Therefore, the recognition method is not specifically described in detail. In addition, the reason why the voice data is data-compressed in the step S32 is increase recognition speed, and therefore, if not necessary, such data-compression is also not required.

Then, if it is detected that the registration mode is set in the step S9 in FIG. 3A, the microcomputer 12 executes respective steps of the registration mode shown in FIG. 3D–FIG. 3G. Steps S40–S62 of the registration mode are wholly the same as the operations of the steps S10–S32 in the previous recognition mode, and therefore, a duplicate description will be omitted here. However, in a step S63, the voice parameter pattern which is data-compressed in the step S62 is stored in the reference pattern table 54a (FIG. 2) described previously.

Figure 3F:
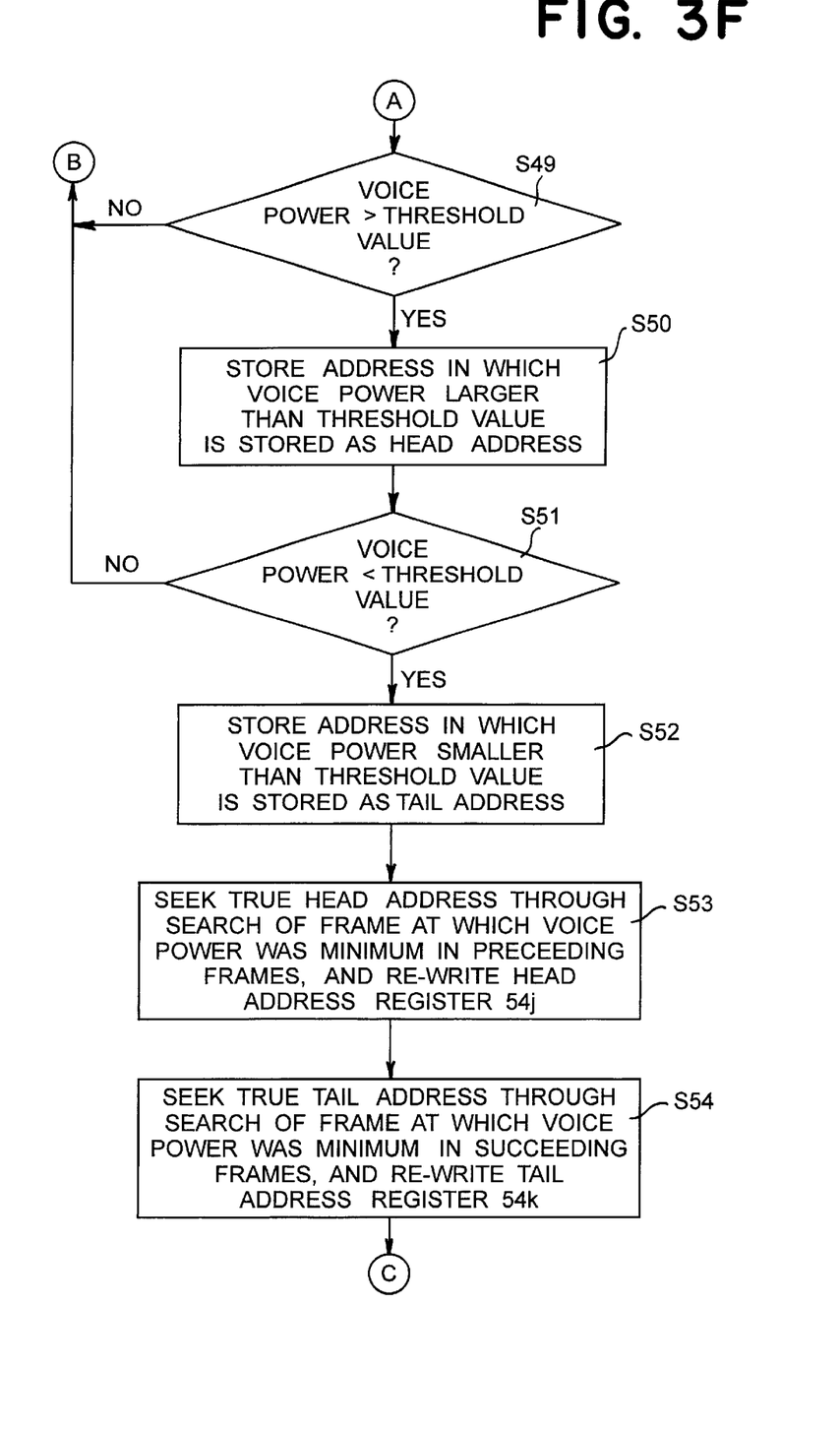
Figure 3G:
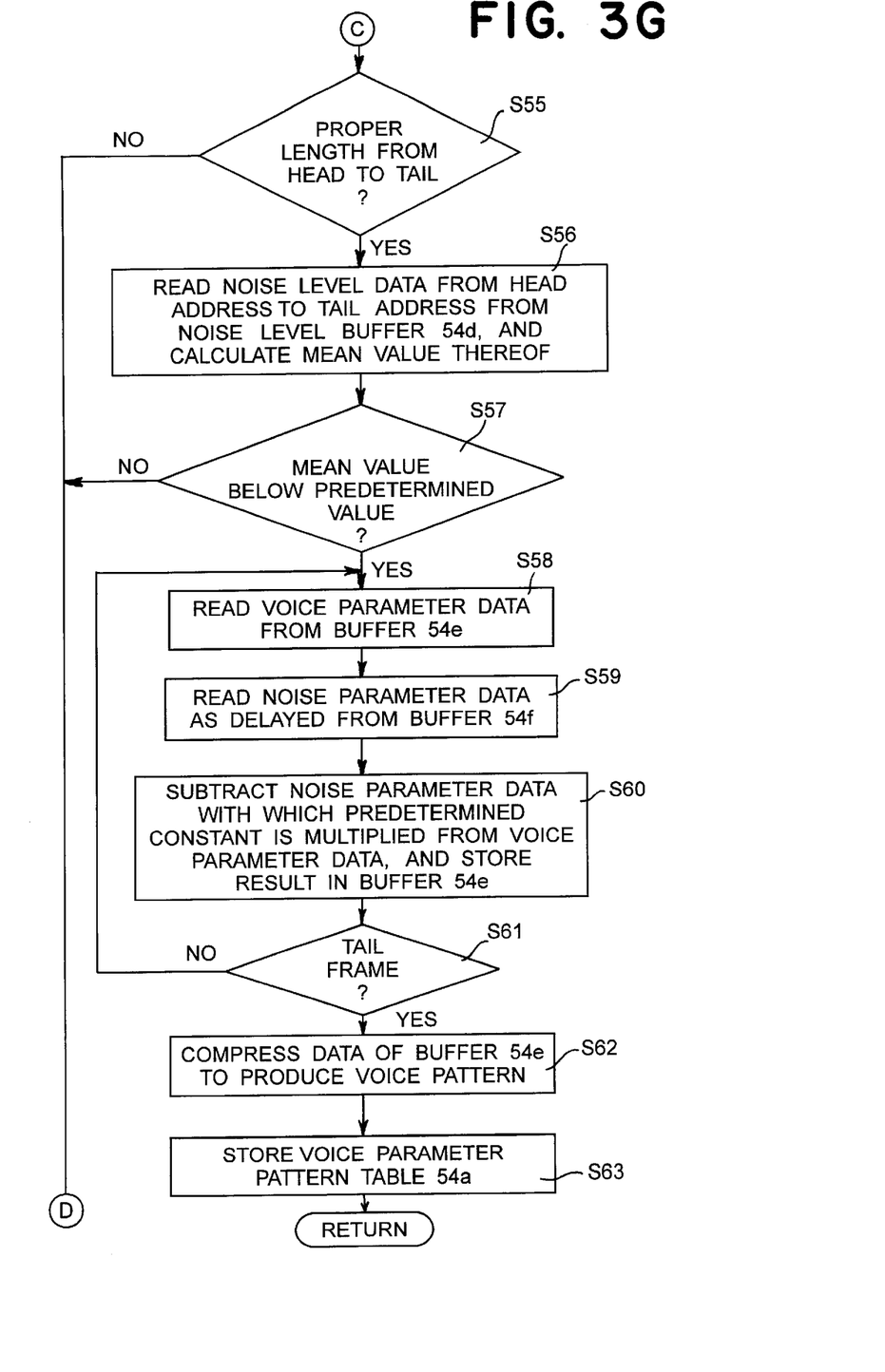

In addition, in the registration mode, when the noise level becomes larger than a predetermined value, the registration of the reference pattern is inhibited (step S57), and a threshold value for sampling the voice parameter data is variably set in accordance with an amplitude of the noise level.

In addition, in the above described embodiment, it is constructed such that the microcomputer 12 controls the audio portion 14 by recognizing the voice from the microphone 32. However, the present invention is not limited to the automobile stereo of the described embodiment and may be arbitrarily applied to a radio, a television set and broadcasting equipment of a background music in an office.

Furthermore, in the above described embodiment, in order to variably set the threshold value, the power data table 54b and the threshold value table 54c are used; however, the threshold value may be changed in response to the noise level through calculation for each frame.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A voice recognizing apparatus, comprising:
    a microphone for inputting a voice signal;
    sound source means independent of any audio input signal received by said microphone for producing a variable level electrical signal representative of ambient noise to be applied to an audio sound source speakers to produce a variable level ambient audio noise that can be picked up by said microphone;
    sampling means for sampling a frame of the voice signal input from said microphone that exceeds a threshold value and for sampling said electrical signs from said sound source means;
    changing means receiving said sampled electrical signal for changing said threshold value in response to said sampled sound source means electrical signal; and
    recognizing means for recognizing the voice signal above the threshold value sampled by said sampling means.

2. A voice recognizing apparatus in accordance with claim 1, further comprising invalidating means for invalidating said sampling means when the level of said electrical signal applied to said audio sound source exceeds a predetermined value.

3. A voice recognizing apparatus in accordance with claim 1, wherein said recognizing means includes a means for producing a determination standard of recognition, and standard changing means for changing said determination standard in accordance with said level of said electrical signal applied to said audio sound source.

4. A voice recognizing apparatus in accordance with claim 1 further comprising registering means for registering a reference pattern on the basis of the voice signal sampled by said sampling means.

5. A voice recognizing apparatus in accordance with claim 4, further comprising invalidating means for substantially invalidating said registering means when the level of said electrical signal applied to said audio sound source exceeds a predetermined value.

6. A voice recognizing apparatus in accordance with claim 1, wherein said changing means includes means for setting said threshold value in accordance with said level of the voice signal input to said microphone when the level of said electrical signal applied to said audio sound source is below a predetermined value.

7. A voice recognizing apparatus in accordance with claim 1, further comprising mode setting means for setting a first mode wherein the voice signal input to said microphone is to be processed or a second mode wherein the voice signal input to said microphone is not to be processed; and means for setting a threshold value which is utilized in said first mode on the basis of the voice signal input to said microphone when said second mode is set.

8. A voice recognizing apparatus as in claim 1 wherein said voice signal and said electrical signal are sample at the same time.

9. A voice recognizing method comprising the steps of:
    (a) receiving a voice signal input to a microphone;
    (b) receiving from a sound source means independent of any signal received by said microphone a variable level electrical signal representative of ambient noise and applying said variable level electrical signal to an audio sound source to produce a variable level of ambient noise that can be received by said microphone;
    (c) sampling the level of said electrical signal from said sound source means;
    (d) sampling a voice signal input to said microphone which exceeds a threshold value;
    (e) variably setting said threshold value for sampling said voice signal in accordance with said level of said sampled electrical signal from said sound source means; and
    (f) recognizing the voice signal sampled in step (d).

10. A voice recognizing method in accordance with claim 9, further comprising a step of (g) registering a reference pattern on the basis of the voice signal as sampled.

11. A voice recognizing apparatus, comprising:
    a microphone to which voice to be recognized is input;
    first sampling means for sampling a feature parameter of a voice signal from said microphone for a plurality of frames, each of a predetermined time interval;
    first converting means for converting said feature parameter sampled by said first sampling means into first feature parameter data;

first memory means for storing said first feature parameter data output from said first converting means for a plurality of frames;

first reading means for reading a series of said first feature parameter data exceeding a threshold value from said first memory means;

input means for receiving from a sound source means independent of any signal received by said microphone a variable level electrical signal representative of ambient noise to be supplied to an audio sound source that produces a corresponding variable level ambient audio noise to be received by said microphone;

detecting means for detecting from said sound source means electrical signal a level of ambient noise to be produced by the audio sound source;

threshold value setting means for variably setting said threshold value in accordance with an amplitude of the level of said sound source means electrical signal; and recognition means for recognizing said voice on the basis of said series of said first feature parameter data.

12. A voice recognizing apparatus in accordance with claim 11, wherein said threshold value setting means includes means for setting said threshold value on the basis of power data of said voice signal inputted from said microphone when the level of said electrical signal is low.

13. A voice recognizing apparatus in accordance with claim 11, wherein said threshold value setting means includes weighted mean value calculation means for calculating a weighted mean value of said threshold value.

14. A voice recognizing apparatus in accordance with claim 12, further comprising second memory means for storing said threshold value set by said threshold value setting means for each frame; wherein said weighted mean value calculation means calculates a weighted mean value of one or more threshold values of one or more prior frames read from said second memory means and a threshold value of a current frame.

15. A voice recognizing apparatus in accordance with claim 14, further comprising detecting means for detecting whether or not said level of said electrical signal increases; wherein said weighted mean value calculation means sets a weight of the threshold value of said current frame to be larger than a weight of the threshold values of said prior frames when said detecting means detects that the level of said electrical signal increases.

16. A voice recognizing apparatus in accordance with claim 15, wherein said weighted mean value calculation means sets a weight of the threshold value of said current frame to be smaller than a weight of the threshold values of said prior frames when said detecting means does not detect that the level of said electrical signal increases.

17. A voice recognizing apparatus in accordance with claim 13, further comprising detecting means for detecting whether or not a level of said electrical signal increases; wherein weighted mean value calculation means sets a weight of the threshold value of said current frame to be smaller than a weight of the threshold values of said prior frames when said detecting means does not detect that said levels of said electrical signal increases.

18. A voice recognizing apparatus in accordance with claim 11, further comprising invalidating means for invalidating said first reading means when the level of said electrical signal is more than a predetermined value.

19. A voice recognizing apparatus in accordance with claim 11, further comprising first and second address storing means for respectively storing a head frame and a tail frame of said first feature parameter data read from said first memory means by said first reading means.

20. A voice recognizing apparatus in accordance with claim 19, further comprising address determining means for determining a true head frame address and a true tail frame address on the basis of said head frame address and said tail frame address respectively stored in said first and second address storing means; wherein said first reading means reads said first feature parameter data from said first memory means from said true head frame address to said true tail frame address.

21. A voice recognizing apparatus in accordance with claim 20, wherein said address determining means includes means for determining an address of said first memory means which is prior to said head frame address stored in said first address storing means and stores a minimum value as said true head frame address and an address of said first memory means which is after said head frame address stored in said first address storing means and stores a minimum value as said true tail frame address.

22. A voice recognizing apparatus in accordance with claim 11, further comprising:

second sampling means for sampling a feature parameter of said electrical signal representative of said ambient noise for each frame with said predetermined time interval;

second converting means for converting said feature parameter sampled by said second sampling means into second feature parameter data;

second memory means for storing said second feature parameter data outputted from said second converting means for a plurality of frames;

second reading means for reading said second feature parameter data from an address of said second memory means corresponding to that of said first memory means which is read by said first reading means; and subtracting means for subtracting said second feature parameter data from said first feature parameter data.

23. A voice recognizing apparatus in accordance with claim 22, wherein said second reading means reads said second feature parameter data from an address of said second memory means equal to a frame which is delayed from a frame corresponding to an address of said first memory means which is read by said first reading means.

24. A voice recognizing apparatus in accordance with claim 22, wherein said subtracting means subtracts said second feature parameter data read from said second memory means which is multiplied by a predetermined constant from said first feature parameter data.

25. A voice recognizing apparatus in accordance with claim 22, wherein said recognition means recognizes the voice inputted from said microphone on the basis of a subtraction result by said subtracting means.

26. A voice recognizing apparatus in accordance with claim 25, further comprising first invalidating means for invalidating said recognition means when the level of said electrical signal is greater than a predetermined value.

27. A voice recognizing apparatus in accordance with claim 22, further comprising registration means for registering a feature parameter pattern of the voice inputted from said microphone on the basis of a subtraction result of said subtracting means.

28. A voice recognizing apparatus in accordance with claim 27, further comprising second invalidating means for invalidating said registration means when the level of said electrical signal is greater than a predetermined value.

29. A voice recognizing apparatus in accordance with claim 11, wherein the ambient noise is generated from a loudspeaker in response to said electrical signal produced from audio equipment.

30. A voice recognizing apparatus according to claim 29 wherein recognition means recognizes the voice inputted from said microphone through a comparison of said first feature parameter data read by said first reading means and a reference pattern.

31. A voice recognizing apparatus in accordance with claim 30, further comprising controlling means for controlling said audio equipment in response to a recognition result of said recognition means.

32. A voice recognizing apparatus in accordance with claim 11, wherein said threshold value setting means includes means for setting said threshold value in accordance with a level of a voice signal from said microphone when the level of said electrical signal is below a predetermined value.

33. A voice recognizing apparatus in accordance with claim 11, further comprising mode setting means for setting a first mode wherein the voice signal from said microphone is to be processed or a second mode wherein the voice signal from said microphone is not to be processed; and means for setting a threshold value which is utilized in said first mode on the basis of the voice signal from said microphone when said second mode is set.

34. A voice recognizing apparatus in accordance with claim 22, wherein said ambient noise is generated from a loudspeaker in response to said electrical signal generated from audio equipment.

* * * * *